No. 854,219. PATENTED MAY 21, 1907.
C. C. IBSON.
NEST.
APPLICATION FILED DEC. 26, 1906.
2 SHEETS—SHEET 1.
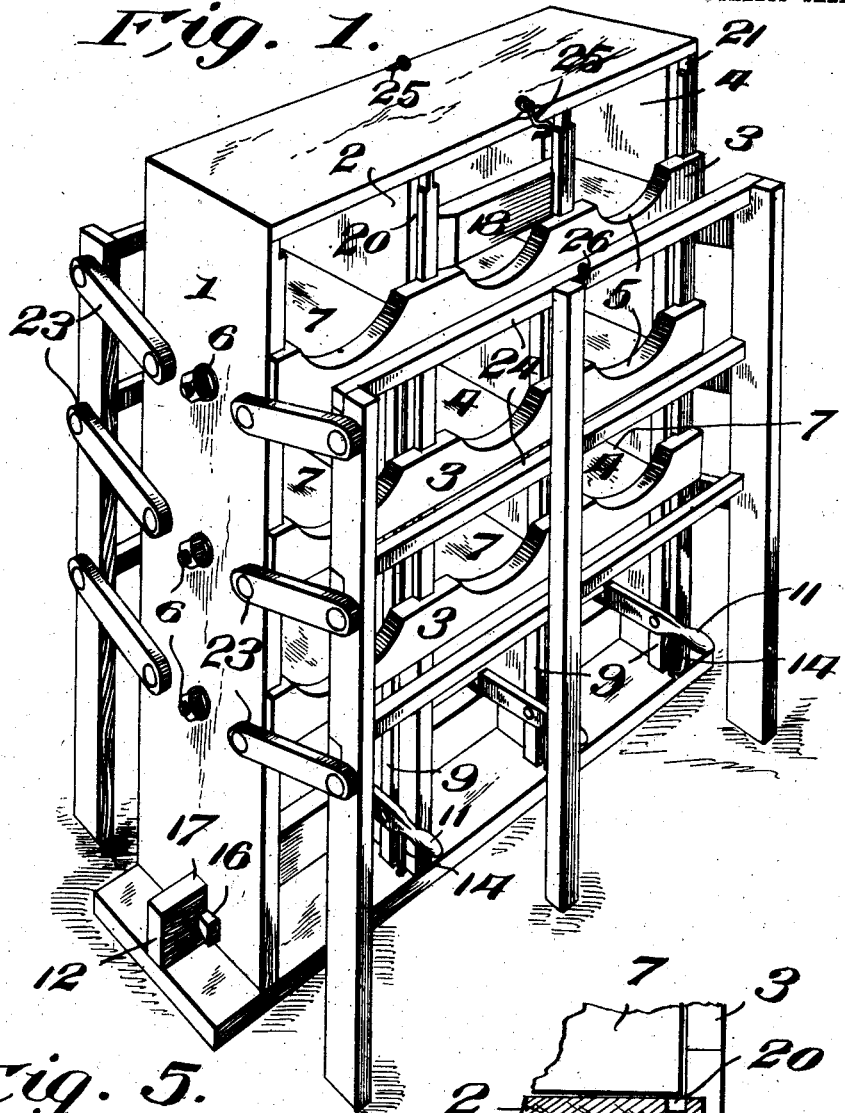
Witnesses
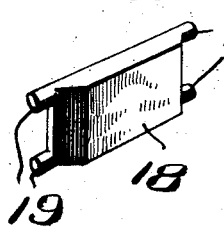
Inventor
C. C. Ibson
By W. J. Fitzgerald & Co.
Attorneys

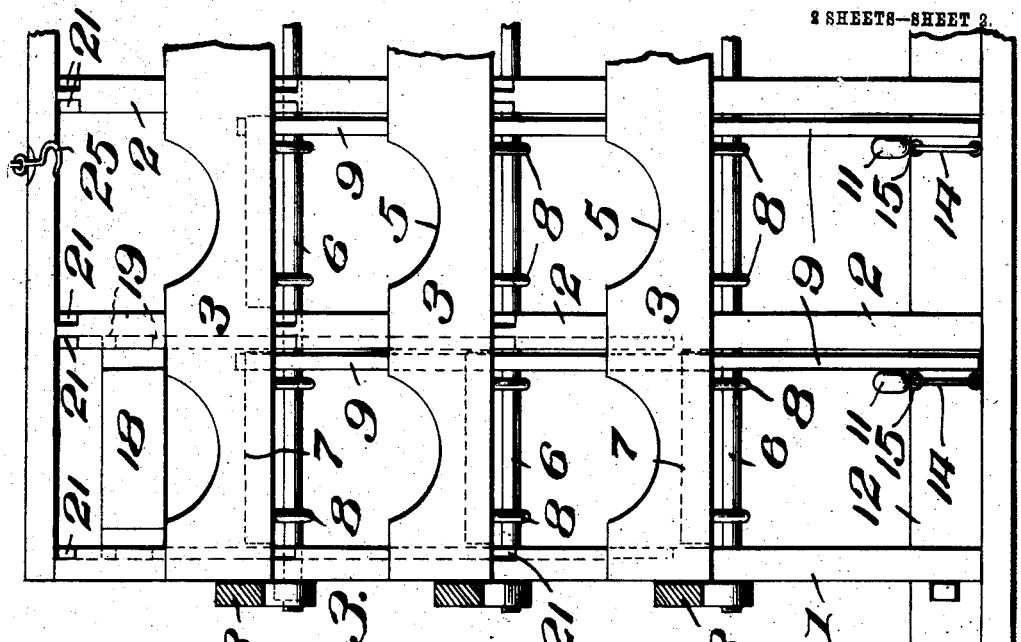
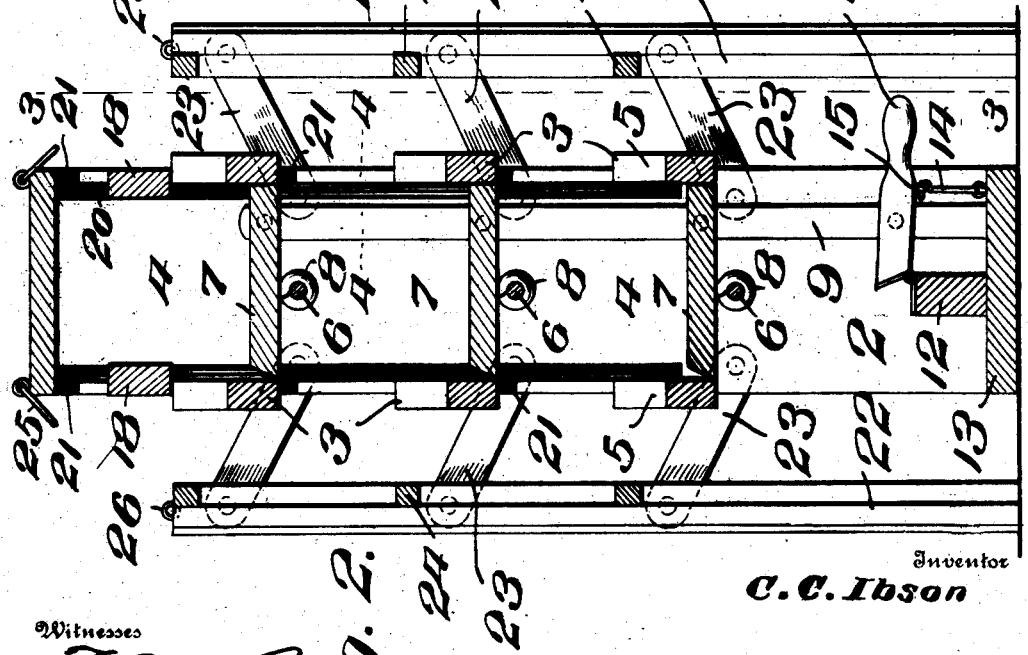

UNITED STATES PATENT OFFICE.

CARL C. IBSON, OF ASTOR, IOWA.

NEST.

No. 854,219.   Specification of Letters Patent.   Patented May 21, 1907.

Application filed December 26, 1906. Serial No. 349,464.

*To all whom it may concern:*

Be it known that I, CARL C. IBSON, a citizen of the United States, residing at Astor, in the county of Crawford and State of Iowa, have invented certain new and useful Improvements in Nests; and I do hereby declare the following to be a full, clear, and exact description of the invention, such as will enable others skilled in the art to which it appertains to make and use the same.

My invention relates to new and useful improvements in nests and more particularly to that class adapted to be employed for poultry and my object is to provide a plurality of nests so that a large number of the poultry may be accommodated and at the same time assemble the nests within a small space.

A further object is to provide means whereby the poultry may have ready access to the respective nests and from either side thereof.

A further object is to provide means whereby either or both sides of any particular nest may be closed so that the poultry can not gain access to or leave the nest.

A further object is to provide means for closing one or both sides of all of the nests at one and the same time, and a still further object is to provide means for tilting the floors of the nests whereby the same may be readily cleaned.

Other objects and advantages will be hereinafter referred to and more particularly pointed out in the claims.

In the accompanying drawings which are made a part of this application, Figure 1 is a perspective view of my improved device complete and ready for use. Fig. 2 is a transverse vertical sectional view therethrough. Fig. 3 is a sectional view as seen on line 3—3 Fig. 2. Fig. 4 is a detail sectional view as seen on line 4—4 Fig. 2, and Fig. 5 is a perspective view of the device for independently closing the nests.

Referring to the drawings in which similar reference numerals designate corresponding parts throughout the several views, 1 indicates the body of my improved device which is substantially in the form of a frame, the interior of the body being provided with any number of vertical partitions 2 and in this instance I have shown two of the partitions which divide the body into three equal compartments.

Disposed horizontally across each face of the body 1 are a plurality of division bars 3 which serve to divide the compartments formed by the vertical partitions 2 into a series of nests 4 and in this instance I have shown three of the bars upon each face of the body thereby providing nine separate nests and in order to give the fowl ready access to the nests the bars 3 are provided with depressions 5 on their upper edges said depressions being located immediately in front of the nests.

Extending laterally through the body 1 and vertical partitions 2 are supporting rods 6 said rods being disposed at a point below the plane of the lower edges of the bars 3, there being one rod for each set of bars, and are adapted to support the floors 7 of the nests 4 said floors being pivotally mounted upon the rods in any preferred manner as by employing screw eyes 8 which surround the rods and enter the bottom portion of the floors.

The object in pivotally mounting the floors upon the rods is to provide a convenient means for readily and quickly cleaning the nests and removing any collection of rubbish therefrom and to this end I have provided means for tilting all of the floors in one tier of nests simultaneously, which consists of a vertically disposed standard 9 to which is pivotally secured each of the floors 7 one edge of said floors being provided with ways 10 in which said standard is seated.

In order to conveniently move the standard vertically so that the floors will be tilted I provide a lever 11 which is pivotally secured to the lower end of the standard 9 and has one of its ends hingedly secured to a tie bar 12 at the lower end of the body 1 and it will be seen that by elevating the outer free end of the lever 11 that the standard 9 will be elevated and the floors 7 tilted so that the contents of the nests will descend and be deposited upon the ground or into any suitable receptacle provided for catching the same.

In order to prevent accidental tilting of the floors 7 I secure to the base 13 of the body 1 a hook 14 the upper end of which is disposed into engagement with an eye 15 carried by the lever 11 so that when said hook is into engagement with the eye the lever can not be elevated.

The tie bar 12 is fixedly secured to the base 13 and extends beyond each end wall of the body 1 the object of said tie bar being to lend rigidity to the base and body and in order to more securely brace the end walls I dispose keys 16 through opening 17 in the ends of the tie bar said opening being so located that the keys will bind against the ends of the body.

When it is desired to close any individual nest a closure plate 18 is provided, the opposite ends of which have trunnions 19 at the upper and lower edges thereof and by directing said trunnions into grooves 20 formed at each edge of the partitions 2 and end walls of the body and moving the plate downwardly until it engages the upper edge of the bars 3 the opening to the nest will be sufficiently closed to prevent ingress or egress of the fowl to the nest.

Access to the grooves 20 is gained through channels 21 formed in the end walls of the body and the vertical partitions said channels intersecting the grooves and are formed at the extreme upper end of each nest so that when it is desired to insert the closure plate the trunnions at the lower edge of the plate are first inserted through the channels 21 and into the grooves, when the plate is moved downwardly a sufficient distance to allow the trunnion at the upper edge of the plate to pass through the channel 21 and enter the grooves 20 and it will be seen that when the plate is lowered into engagement with the upper edge of the bars 3 that it will be impossible to accidentally misplace or remove the plate.

When it is desired to close one or both entrances to the nests at the same time I have provided racks 22 one for each side of the body and the racks are yieldingly secured to the body by means of links 23, one end of which is pivotally secured to the ends of the body while the opposite ends thereof are pivotally secured to the racks and said racks are so constructed that they will sit at a distance from the openings to the nests, when swung outwardly by the links, and when so disposed the reach bars 24 of the rack form a perch for the fowl and a reach is provided for each tier of nests and are substantially on a plane with the upper edge of the bars 3 when the rack is at a distance from the body so that when the fowl alights upon the reach ready access to the nest can be had therefrom, thereby obviating the necessity of the fowl jumping directly into the nest from the floor.

When it is desired to use the racks for closing the entrances to the nests said racks are swung upwardly which will result in disposing the reach bars 24 across the openings to the nests, thereby preventing the fowl from entering the same and the racks are held in their elevated position in any preferred manner as by securing hooks 25 to the upper end of the body 1 which are adapted to engage eyes 26 on the racks 22.

It will now be seen that I have provided a very cheap and economical device for the purpose desired and one wherein a large number of nests may be provided and occupy but a small space.

It will further be seen that I have provided means for readily and quickly closing any one of the nests individually or all of the nests simultaneously.

What I claim is:—

1. In a device of the class described the combination with a body having vertical partitions therein, of bars extending across the faces of said partitions and body said bars having depressions therein, floor sections pivotally mounted between said partitions and body and means to simultaneously tilt said floor sections whereby foreign particles on the floor will be removed.

2. In a device of the class described the combination with a body having vertically disposed partitions therein, of bars arranged in pairs and extending across each face of said partitions and body, a plurality of floors pivotally mounted between said bars and partitions, means to simultaneously tilt said floor sections, said floor sections and bars forming nests and means to close said nests when desired.

3. In a device of the class described the combination with a body having partitions therein, of means to form nests between said partitions and walls of the body comprising bars arranged in pairs across the face of said body and partitions, rods disposed transversely through said body and partitions, floor sections pivotally mounted upon said rods, a standard for each tier of floor sections, means to operate said standard whereby all the floors in one tier will be simultaneously tilted, a rack at each side of said body, means to pivotally secure said rack to the body and reach bars on said rack adapted to be disposed over the entrances to said nests when the racks are elevated.

In testimony whereof I have signed my name to this specification in the presence of two subscribing witnesses.

CARL C. IBSON.

Witnesses:
R. C. JACKSON,
ROSWELL SAUNDERS.